United States Patent
Krasun et al.

(10) Patent No.: US 7,725,817 B2
(45) Date of Patent: May 25, 2010

(54) GENERATING A PARSER AND PARSING A DOCUMENT

(75) Inventors: Andrew McColl Krasun, Broughton (GB); John Brian Pickering, Winchester (GB); William Nicholas John Tindall, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 1197 days.

(21) Appl. No.: 11/302,547

(22) Filed: Dec. 13, 2005

(65) Prior Publication Data

US 2006/0155726 A1 Jul. 13, 2006

(30) Foreign Application Priority Data

Dec. 24, 2004 (GB) .................................. 0428365.1

(51) Int. Cl.
*G06F 17/00* (2006.01)
*G06F 9/45* (2006.01)

(52) U.S. Cl. ........................................ 715/236; 717/143
(58) Field of Classification Search ................. 715/206, 715/234, 235, 236, 237; 717/143
See application file for complete search history.

(56) References Cited

U.S. PATENT DOCUMENTS

| | | | | |
|---|---|---|---|---|
| 5,748,878 A | * | 5/1998 | Rees et al. ..................... 714/38 |
| 5,893,131 A | * | 4/1999 | Kornfeld ..................... 715/236 |
| 5,940,615 A | * | 8/1999 | Novick et al. ............... 717/109 |
| 6,115,686 A | * | 9/2000 | Chung et al. ................. 704/260 |
| 6,236,978 B1 | * | 5/2001 | Tuzhilin ........................ 705/26 |
| 6,424,980 B1 | * | 7/2002 | Iizuka et al. ................. 715/206 |
| 6,507,856 B1 | * | 1/2003 | Chen et al. ................... 715/205 |
| 6,635,089 B1 | * | 10/2003 | Burkett et al. ............... 715/235 |
| 6,671,853 B1 | * | 12/2003 | Burkett et al. ............... 715/235 |
| 6,925,631 B2 | * | 8/2005 | Golden ........................ 717/115 |
| 7,080,094 B2 | * | 7/2006 | Dapp et al. .................. 707/102 |
| 7,134,075 B2 | * | 11/2006 | Hind et al. ................... 715/239 |
| 7,281,205 B2 | * | 10/2007 | Brook .......................... 715/237 |
| 7,376,661 B2 | * | 5/2008 | Larson ........................ 707/101 |
| 2001/0018697 A1 | * | 8/2001 | Kunitake et al. ............ 707/517 |
| 2002/0120628 A1 | * | 8/2002 | Hitchcock et al. ........... 707/100 |
| 2002/0141449 A1 | * | 10/2002 | Johnson ...................... 370/473 |
| 2003/0229846 A1 | * | 12/2003 | Sethi et al. .................. 715/500 |
| 2004/0133595 A1 | * | 7/2004 | Black ....................... 707/103 Y |
| 2005/0044491 A1 | * | 2/2005 | Peterson ..................... 715/517 |
| 2006/0117307 A1 | * | 6/2006 | Averbuch et al. ............ 717/143 |

FOREIGN PATENT DOCUMENTS

WO 02/44936 6/2002

* cited by examiner

*Primary Examiner*—Laurie Ries
(74) *Attorney, Agent, or Firm*—Stephen Calogero; Law Office of Jim Boice (57) ABSTRACT

A parser is generated for parsing a marked up document. A template of a sample marked up document chosen by a user is extracted. The template comprises elements of the structural markup of the sample document with their data contents removed. The parser for parsing a marked up document is generated. The parser is generated in the form of code based on the extracted template in such a manner that the parser is adapted to extract any elements and associated data content of the marked up document to be parsed corresponding to the elements of the extracted template.

10 Claims, 7 Drawing Sheets

```
<?XML VERSION="1.0" ENCODING="IBM-1140" STANDALONE="YES"?>
<SANDWICH>
<BREAD CHAR="BAKERS BEST"/>
<MEAT>HAM,TURKEY</MEAT>
<FILLING>CHEESE, LETTUCE, TOMATO</FILLING>
<LISTPRICE>$4.99 </LISTPRICE>
</SANDWICH>
```

FIG 4

```
<?XML VERSION="1.0" ENCODING="IBM-1140" STANDALONE="YES"?>
<SANDWICH>
<BREAD CHAR="BROWN"/>
<MEAT>BEEF</MEAT>
<FILLING>LETTUCE, TOMATO</FILLING>
<LISTPRICE>$6.99 </LISTPRICE>
</SANDWICH>
```

FIG 5

```xml
<?XML VERSION="1.0" ENCODING="IBM-1140" STANDALONE="YES"?>
<SANDWICH>
<BREAD CHAR="#"/>
<MEAT>#</MEAT>
<FILLING>#</FILLING>
<LISTPRICE>#</LISTPRICE>
</SANDWICH>
```

FIG 6

| Tag | Data for Tag |
|---|---|
| BREAD CHAR | BAKERS BEST |
| MEAT | HAM,TURKEY |
| FILLING | CHEESE, LETTUCE, TOMATO |
| LISTPRICE | $4.99 |

| Item | Type of item | Depth before | Depth after |
|---|---|---|---|
| <?XML VERSION="1.0" ENCODING="IBM-1140" STANDALONE="YES"?> | XML header | 0 | 0 |
| <SANDWICH> | Start tag and end of tag | 0 | 1 |
| <BREAD | Start tag | 1 | 2 |
| CHAR=" | Attribute | 2 | 2 |
| "/> | End of attribute and end of tag | 2 | 1 |
| <MEAT> | Start tag and end of tag | 1 | 2 |
| </MEAT> | End tag | 2 | 1 |
| <FILLING> | Start tag and end of tag | 1 | 2 |
| </FILLING> | End tag | 2 | 1 |
| <LISTPRICE> | Start tag and end of tag | 1 | 2 |
| </LISTPRICE> | End tag | 2 | 1 |
| </SANDWICH> | End tag | 1 | 0 |

FIG. 7

| Index | Item | Type of item | Depth before | Depth after | Address | Length | End token |
|---|---|---|---|---|---|---|---|
| 1 | <?XML VERSION="1.0" ENCODING="IBM-1140" STANDALONE="YES"?> Any white space in original<SANDWICH>Any white space in original<BREAD Any white space in original CHAR=" | XML header plus boilerplate | 0 | 2 | | | " |
| 2 | "/>Any white space in original <MEAT> | BREAD attribute data Boilerplate | 2 2 | 2 2 | | 9 + AWS(2) | </ |
| 3 | </MEAT>Any white space in original <FILLING> | MEAT data Boilerplate | 2 2 | 2 2 | | 17 + AWS(3) | </ |
| 4 | </FILLING>Any white space in original <LISTPRICE> | FILLING data Boilerplate | 2 2 | 2 2 | | 22 + AWS(4) | </ |
| 5 | </LISTPRICE>Any white space in original </SANDWICH> | LISTPRICE data End tag | 2 2 | 2 0 | | 24 AWS(5) | |

GENERATING A PARSER AND PARSING A DOCUMENT

CROSS-REFERENCE TO RELATED APPLICATIONS

This application claims foreign priority benefits under 35 U.S.C. §119 to co-pending UK patent application number UK 0428365.1, filed Dec. 24, 2004 and is incorporated herein by reference.

BACKGROUND OF THE INVENTION

The present invention relates to generating a parser and to parsing a marked up document.

Currently there are three main technologies that are used to parse an XML document. First, Document Object Model (DOM) may be used to parse a complete document into a tire and provides an API to traverse the tree and extract the data. Second, a simple API for XML(SAX) may be used to parse a document and provide events, optionally with data, to a user application. Third, pull-parsing is a derivative of SAX where the user application is in charge of the looping mechanism that scans the document.

Currently there are three main technologies that are used to parse an XML document. First, Document Object Model (DOM) may be used to parse a complete document into a tree and provides an API to traverse the tree and extract the data. Second, a simple API for XML(SAX) may be used parse a document and provide events, optionally with data, to a user application. Third, pull-parsing is a derivative of SAX where the user application is in charge of the looping mechanism that scans the document.

BRIEF SUMMARY OF THE INVENTION

According to a first aspect of the present invention, a method of generating a parser for parsing a marked up document comprises scanning a sample marked up document, extracting a template of the sample marked up document, wherein the template comprises elements of the structural markup of the sample document with the data contents of the elements removed, and generating a parser for parsing a marked up document, wherein the parser is generated in the form of code based on the extracted template in such a manner that the parser is adapted to extract any elements and associated data content of the marked up document to be parsed corresponding to the elements of the extracted template.

According to another aspect of the present invention, a method of parsing a marked up document comprises parsing the marked up document by finding locations in the marked up document corresponding to locations of data content in a sample marked up document and extracting any data contents at these locations in the marked up document.

According to yet another aspect of the present invention, a computer program product for generating a parser for parsing a marked up document comprises a computer usable medium having computer useable program code embodied therewith. The computer useable program code comprises computer usable program code configured to scan a sample marked up document, computer usable program code configured to extract a template of the sample marked up document, wherein the template comprises elements of the structural markup of the sample document with the data contents of the elements removed, and computer usable program code configured to generate a parser for parsing a marked up document, wherein the parser is generated in the form of code based on the extracted template in such a manner that the parser is adapted to extract any elements and associated data content of the marked up document to be parsed corresponding to the elements of the extracted template.

Other aspects and features of the present invention will become apparent to those ordinarily skilled in the art or science to which it pertains upon review of the following description in conjunction with the accompanying figures.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
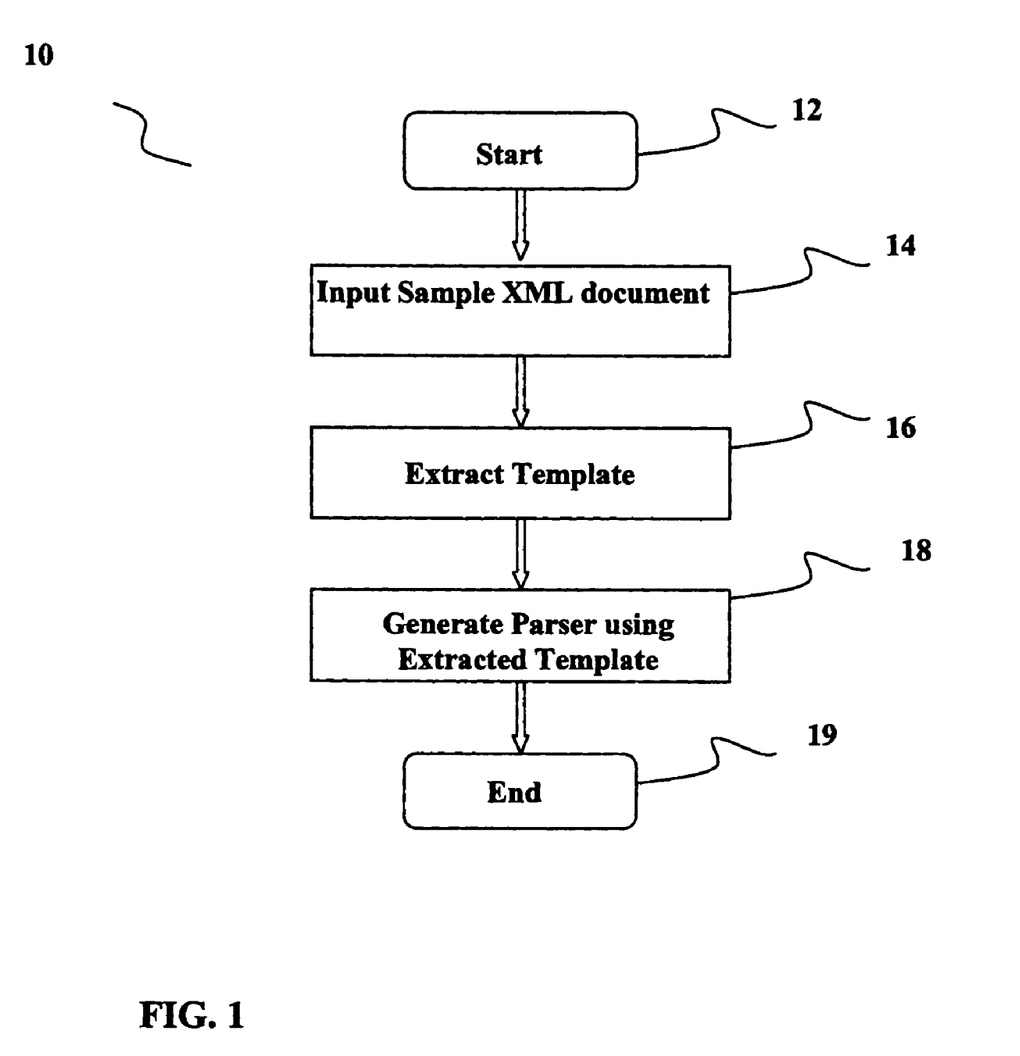
FIG. 1 shows a method 10 for generating an XML parser.

Turning now to FIG. 1, there is shown a flow chart of a method 10 of generating an XML parser. For ease of explanation, the method 10 is described with reference to the XML language, however the method 10 is not intended to be limited to such a language. The method 10 can be applied to other markup languages such as HTML, WML, VoiceXML, SALT etc with appropriate modifications.

The method 10 of generating an XML parser starts at step 12, where any-necessary parameters are initialized. The method 10 then inputs 14 a sample XML document, which sample document is chosen by a user as typical of the XML documents that the parser is required to parse. The method 10 then scans this sample XML document and extracts 16 a boiler plate or template of the sample XML document. After this template has been extracted, the method 10 proceeds to generate 18 a parser in the form of software code using this extracted template, after which the method 10 terminates 19.

The manner in which this parser is generated will be described below in more detail.

The present method 10 is based on the recognition that XML documents are often generated by software, and, as a result, the format and contents of the XML documents are uniform. The present method 10 examines a sample XML document of a particular format and from this identifies the locations of the specific data contents in the XML document, generating a template for the sample XML document. Once these locations have been identified, a specific XML parser is generated to extract the data contents of the XML documents specified in the same particular format. In this sense the generated parser is dynamically adaptive depending upon the sample XML document that is input and undertakes a structural (via format) and data content analysis for speed as well as complexity in the parse.

Figure 2:
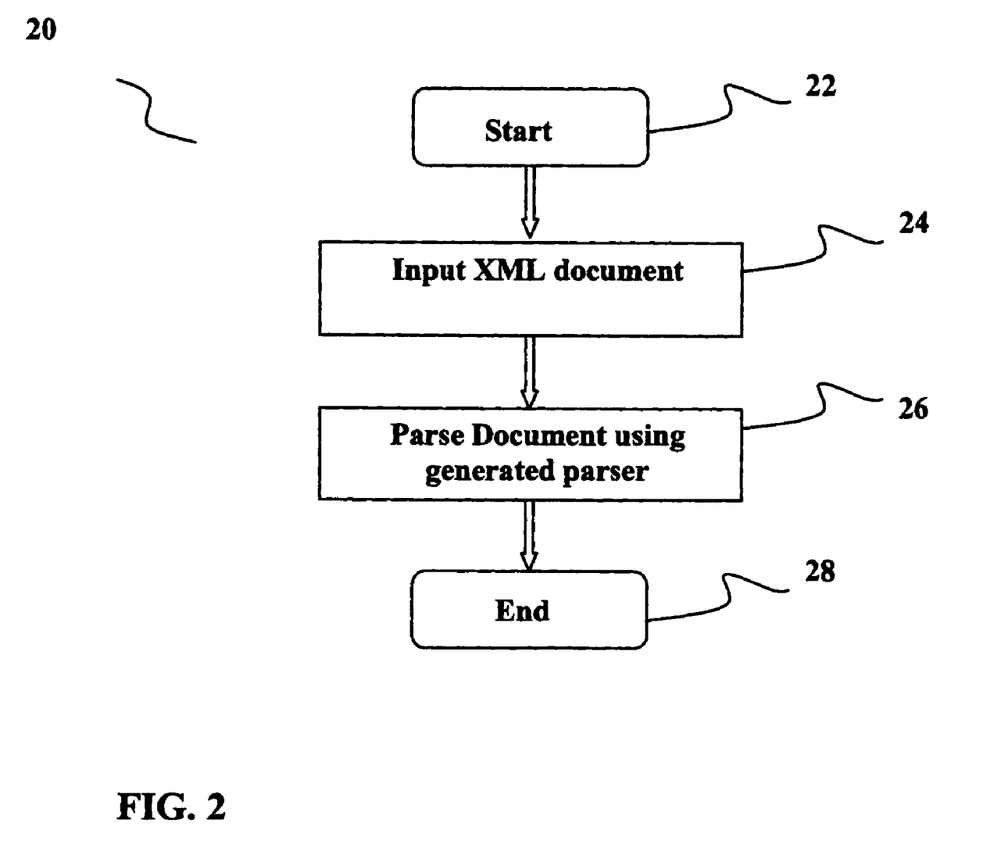
FIG. 2 shows a method 20 for parsing an XML document using the XML parser generated by the method of FIG. 1.

Turning now to FIG. 2, there is shown a flow chart of a method 20 for parsing an XML document using the XML parser generated by the method shown in FIG. 1. The method 20 of parsing the XML document starts at step 22, where any necessary parameters are initialized. The method 20 then inputs 24 the XML document to be parsed, and then parses 26 the XML document using the parser generated by the method 10. This parser is very quick because it has very limited capabilities, tailored to the particular format of the sample XML document. After the method 20 has completed parsing the XML document, the method 20 then terminates 28.

In this way, the present methods use the knowledge that computer generated XML documents are generally uniform in format to reduce the cost of extracting the data from the document. Furthermore, dependent upon the computer architecture involved, those with aggregate instructions, for example an IBM z-Series machine, the use of Compare Logical Characters (CLCj) and Compare Logical Characters Long (CLCL) and Translate and Test (TRT) can dramatically add to the reduction of the number of cycles compared with a C language character look-up loop or the invocation of a memcmp function.

Figure 3:
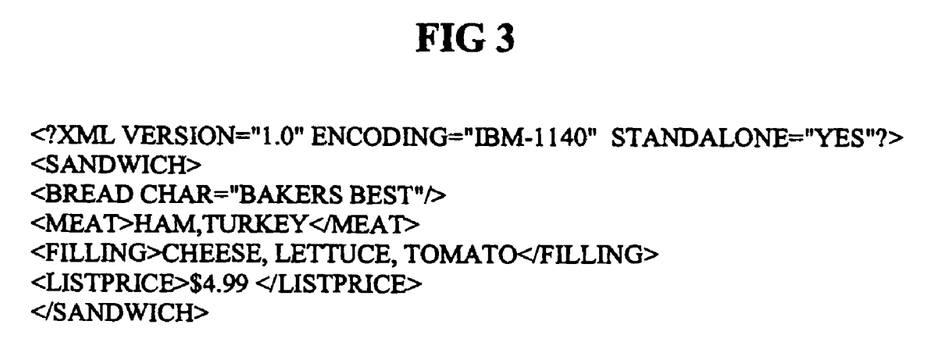
FIG. 3 shows an example of an XML document for ordering a fast food sandwich.
Figure 4:
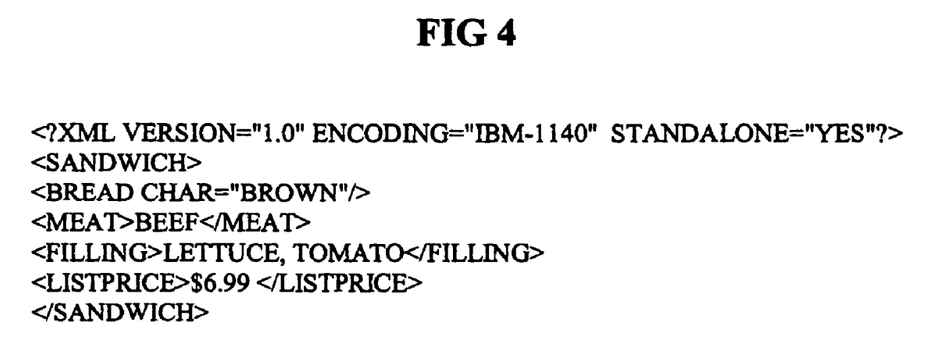
FIG. 4 shows another example of an XML document for ordering a fast food sandwich.

For a more detailed understanding of the operation of the method 10, reference is made to FIGS. 3 to 6. FIGS. 3 and 4 show example XML documents for ordering a fast food sandwich, which are typical of the XML documents that a user may require to be XML parsed. Typically, XML documents are made of different elements, which elements, e.g. <MEAT> can be nested within other elements and make up a document tree. These elements encapsulate their associated data content. For example, in FIG. 3 the associated data content for the element <MEAT> . . . </MEAT> is HAM, TURKEY. These elements may also comprise associated data content which further defines the element, in the form of attributes. For example, in FIG. 3, the attribute for the element <BREAD CHAR=" . . . "/> is BAKERS BEST.

Figure 5:
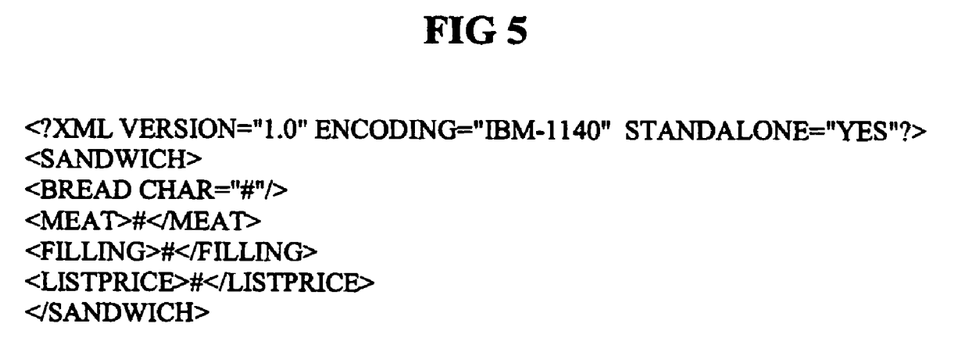
FIG. 5 shows a template extracted by step 16 of FIG. 1 from the XML document of FIG. 3.

The method 10 takes as input one sample XML document chosen by a user, which in this example is the XML document shown in FIG. 3, and the method 10 then extracts 16 a boiler plate or template as shown in FIG. 5. During this extraction step 16 (FIG. 1) the data of the sample XML document is located, removed and replaced with a # sign. The method 10 then generates a parser based on this template.

Because the tags will not vary across marked up documents but the data content between the tags does vary, it is important to separate the two types of content (tag and data) as a first step to parsing. FIG. 5 shows a template generated from the document in FIG. 3. The tags, eg. <SANDWICH>, <BREAD CHAR> etc are preserved, but the data content or attributes within the tag are replaced with a pointer, represented here by the # sign, instead. This pointer may be thought of as a direct index into the memory location of the data content itself.

Figure 6:
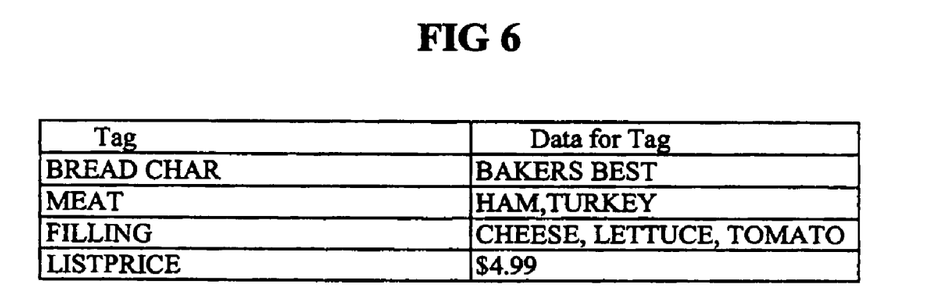
FIG. 6 shows the tags and data extracted by the method 20 of parsing using the boiler template of FIG. 5.

The present method 20 (FIG. 2) uses the parser initialized on the basis of the extracted template (e.g. FIG. 5) against the input stream of a XML document, and obtains data for each tag as shown in FIG. 6. The present method 20 of parsing XML documents is able to use this parser for extracting associated data and interpreting the data by referring to the tags from other XML documents that have the same format, without having to parse each of the XML documents completely from scratch. In FIG. 6 the tags in the first column of the table would remain the same, therefore, for all such XML documents. The data content in the second column, though, would, be expected to change between documents.

The generated parser is built to include the tags of the extracted template in the form of constants so that they may be subsequently compared with the structure of the XML documents to be parsed. The generated parser may also comprise a counter for maintaining a running count of the size of the data content of the XML document to be parsed. The indices or pointers, shown as #, are associated with each tag appropriately such that when an actual XML document is to be parsed, the data content may be retrieved relatively immediately. The two different elements, tag and data content, are therefore used as initialization parameters to a simple parser. The parser locates the dynamic data content within an XML document to be parsed using the indices or pointers together with a running count of the size of data content, and interprets it according to the corresponding constant tags extracted. The current size of the data content is determined by maintaining a running count of the data content commencing at the current pointer address and continuing until the next associated end tag (</) or associated closing attribute delimiter (") is found. The data content of the next tag is then found by addressing the memory location referenced by the next pointer but offset by the running count.

Such parsing is relatively simple, and as a by-product provided the original template is well formed, checking the input can be dispensed with, thus saving more processing cycles. These templates may be built into a tree (in software terms) or switching on the tags. So, if a list is allowed, then when each leaf is reached, a check is made to see if there is another branch which is a repeat of the last one, or if the end of the list has been reached, the code would climb another level in the tree and continue.

Figure 7:
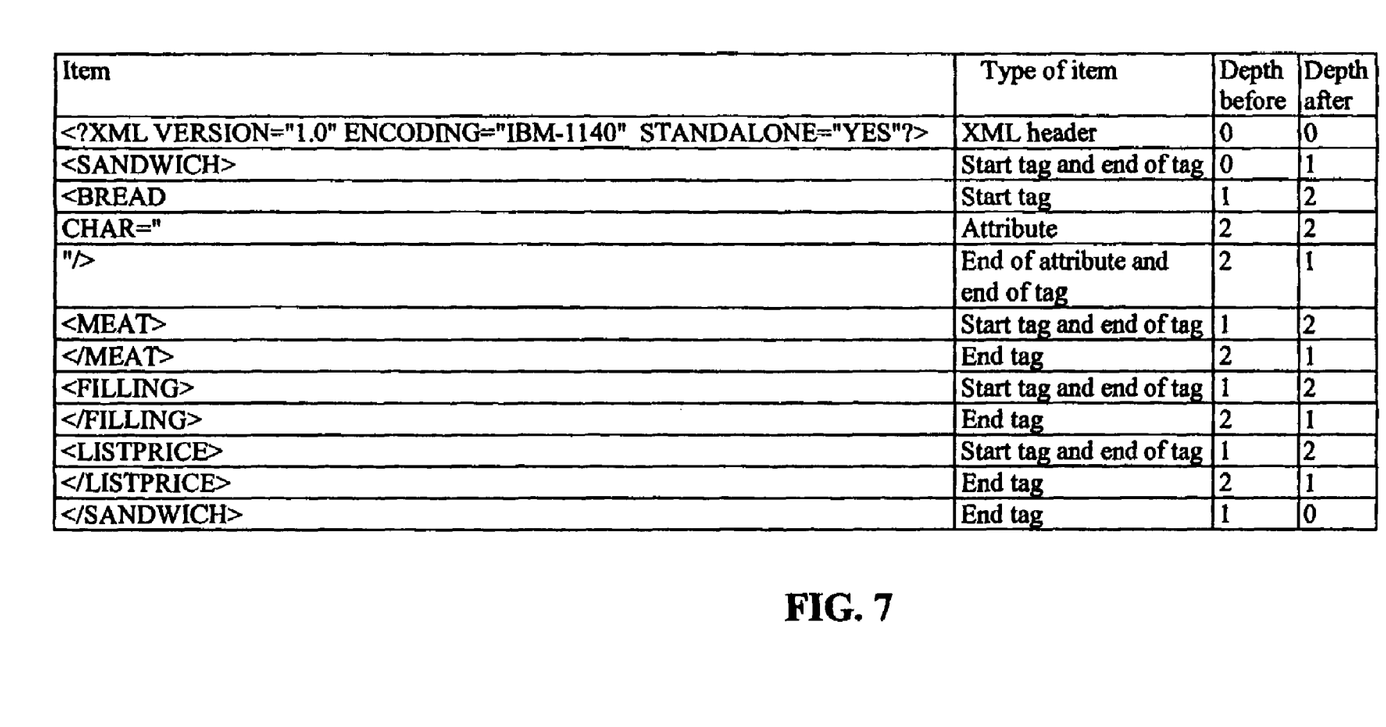
FIG. 7 shows a template extracted by an alternate arrangement of step 16 of FIG. 1 from the XML document of FIG. 3.

Turning now to FIG. 7, there is shown a template extracted by an alternate arrangement of step 16 of FIG. 1, where the template is based on the XML document of FIG. 3. In this alternate arrangement of step 16, the template is extracted and shown here in the form of a table. This table comprises the headings: Item, Type of Item, Depth before, and Depth after, the latter two indicating the position of the item on the tree. The first item in the table is the XML header of the example XML document of FIG. 3. The second item is the opening tag <SANDWICH> delimited by the open and closed delimiters. The third item in the table is a first part, viz <BREAD of the empty tag having an attribute, viz <BREAD CHAR=""/>. The fourth item in the table is the attribute CHAR=" of that empty tag. The fifth item in the table is the closing delimiters of the attribute and the empty tag. The subsequent entries shown in the extracted table of FIG. 7 are self-explanatory and will not be described any further. As can be seen from the Depth before and Depth after fields in the table of FIG. 7, the XML header is at level zero of the tree, the <SANDWICH> tag is at level one on the tree, the <BREAD>, <MEAT>, <FILLiNG> AND <LISTPRICE> tags are at level two of the tree.

The difference here is that additional information is provided to go with the tags themselves. The approach, however, is the same: the tags are used to initialize the parser, identifying which data elements can be expected in the XML documents to be parsed, but this time providing information such as depth which can be used to optimize the parser since, for example, as any particular start tag is encountered, it is readily apparent whether or not it is nested within a preceding one or of equal weight. Furthermore, the pointers are dispensed with and the lengths of the constant tags are used to determine the indices to the opening tags of the template.

So having scanned the input and extracted a template 16 such as that described with reference to FIG. 7, software code, such as that which follows, is generated 18. For the purposes of explanation, all white space processing has been omitted to make the program flow clearer. The following code extract shows an example of an actual parser based on the document in FIG. 3. Each of the initial declarations, ConstXML Version, ConstSandwich and so forth, are generated to correspond to each of the tags found in the template (Note: the names of these parameters are, of course, arbitrary). In addition, a simple function is generated corresponding to each of these declarations, as shown. These function calls are effectively the same in each case, since the job done by the parser is to establish which tag has been encountered and where the associated data content may be found. Although the processing is essentially the same for each tag, we have shown here separate functions per tag. This illustrates that the parser is flexible enough to handle tags in different ways, as shown with the processing of the <BREAD CHAR> from this example. example.

A first pass of the table results in the generation of the following software code:

```
/* Assume input contains the XML message to be parsed */ Declare ConstXML Version STATIC
CHAR INIT('<?XML VERSION="1.0"
ENCODING="IBM-1140"
STANDALONE="YES"?>');
Declare ConstSandwich STATIC CHAR INIT(:<SANDWICH>.);
Declare ConstBread STATIC CHAR INIT('<BREAD CHAR="');
Declare ConstEndAttrtag STATIC CHAR 1NIT('"/>');
...
        if Substr(input,1,LENGTH(ConstXML Version)) = ConstXML Version
    /*then Scanned off
        XML header */
        do;
                indexin = LENGTH(ConstXMLVersion) + 1;
                if Substr(input,indexin,LENGTH(ConstSandwich) =
        ConstSandwich /*then Scanned
```

-continued

```
                    off SANDWICH tag */
                do;
                    indexin = indexin+LENGTH(ConstSandwich);
                if Substr(input,indexin,LENGTH(ConstBread)) =
    ConstBread
                    /* then Scanned off BREAD header */
                    do;
                        endindex = INDEX(SUBSTR(input,indexin),'"'); /*
Look for end of data
                        delimited by" */
                        /* Now know data for BREAD is between indices
index and end index and is
                            BAKERS BEST in the first example*/
                        ProcessBread(input,indexin,endindex); /* Invoke set
method for Bread */
                        indexin = endindex +
LENGTH(ConstEndAttrtag);
                    end;
                    /* A succession of if statements to compare against the
boiler plate and
                    processing calls to co-routines with the data extracted */
                    else
                        return('No match of BREAD1);
                End;
            else
                return('No match of SANDWICH'); /* At this point we could
look for other tags
                    that start other documents */
        end;
    else
        return('No match of header'); /* Continue processing for an unknown
document */
```

The same code written or generated in System/390 Assembler is dramatically shorter, and is listed below:

```
        CLC 0(input,L'ConstXMLVersion),ConstXMLVersion
    BNE noHeaderMatch
    LA input,L'ConstXMLVersion(input) Increment pointer past
    XML header
    *
        CLC 0(input,L'ConstSandwich),ConstSandwich
    BNE noSandwichMatch
    LA input,L'ConstSandwich(input) Increment pointer past
    Sandwich header
    *
        CLC 0(input,L1ConstBread),ConstBread
    BNE noBreadMatch
    LA input,L1ConstBread(input) Increment pointer past
    Bread header
    *
        TRT input, QuoteTable (256) Scan for end of Attribute
    delimiter"
```

This code works for items less than 256 bytes in length, a trivial extension would allow for bytes of greater length.

```
        BAL 14,ProcessBread Implicit parameters passed,
        Register input
            points to start and Register 1 points at end "
                LA input,1+L'ConstEndtag(R1) Increment pointer past
        Bread trailer
        *
        QuoteTable DC 256X'OO'
        ORG QuoteTable+C""
        DC X'04'
        ORG Quote Table + 256
```

Figure 8:
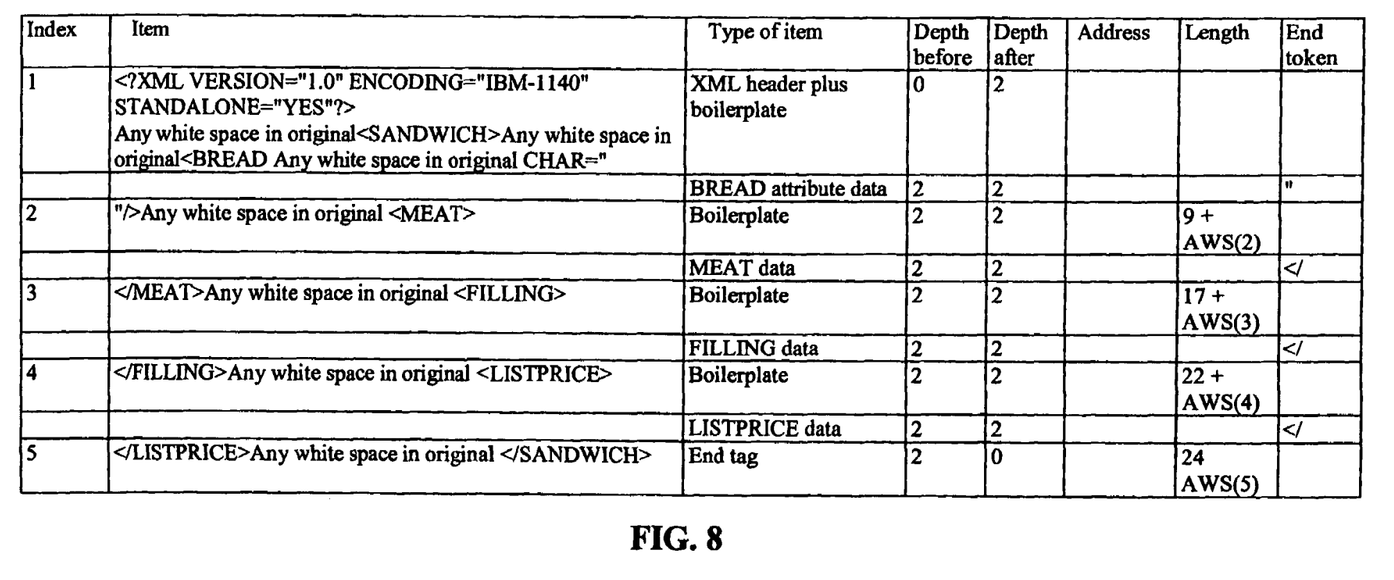
FIG. 8 shows a template extracted by another alternative arrangement of step 16 of FIG. 1 from the XML document of FIG. 3.

Turning now to FIG. 8, there is shown a template extracted by another alternate arrangement of step 16 of FIG. 1, where the template is based on the XML document of FIG. 3. In this further alternate arrangement of step 16, the template is again extracted in the form of a table. This table shown in FIG. 8, gives a different view of the template of the XML document of FIG. 3. By comparing the tags and selling pointers to the beginning of the data the end token is found in its row in the table. This table contains enough data to generate an optimized version of the code mentioned above. This table can be extended to add the other tags in XML because the signature at the beginning is paralleled by a reverse signature at the end.

The template of FIG. 8 differs from the template of FIG. 7 in two important ways. First, though the symbol # referred to designates a pointer, and as such indirectly provides an index to the memory 'address' or location of the data to which it refers. The template shown in the table captures explicitly the memory address, ie., the ACTUAL location within memory where the data is to be found. The second difference is in the inclusion of LENGTH. This is the size of the data content (ie., how many bytes of data are contained within the tags). In the previous embodiments above, this is not explicitly captured, although it can be inferred, basically by counting from the pointer until you hit the end tag. The advantage here, though, relates back to the memcmp function described earlier. If it is known upfront how much data there is, then the entire structure can be copied as a whole. However, effectively, there would be little difference between the code sample shown above and the one utilizing the template of FIG. 8, except that additional parameters would appear within the functions for explicit use of address and data size.

Described below are further details of a parsing process according to one embodiment of the invention. Upon receipt of an XML document, the parser must attempt to generate a parse template and establish whether a new template is required for this document. In the latter case, the document type would not have been seen in advance. This is effected as described in the following steps (1) to (3) of the parsing process.

During the first step (1), the document is scanned to establish (a) the position, in terms of memory offset from the reference memory location of the start of the document, of each opening tag. (b) The identity and order of each tag. Identifying the tag involves stepping past the opening <to the corresponding closing bracket >, and retaining the contents between those two brackets, (c) The depth of the tag, that is whether or not it is nested within another tag, is also established by matching opening and closing tags. Retaining tag depth can be used advantageously to extract subsections of the XML document for separate processing. (d) Since the memory locations as offsets with reference to the starting location will vary in accordance with the length of the associated data and/or any attributes, an internal array is generated which retains the memory offsets of the opening tags in order and by type. For a given document, therefore, there is a fixed representation of any document which does not vary by data content.

During the second step (2) the identity and order of the tags is queried by the parser from the internal array to indicate the type of XML document that has been presented. If the same tags occur in the same order as one previously viewed then there is no further processing of the document, since a template is already available. The template is simply retrieved within the parsing program itself, and applied to the current document. If the same tags do not occur or are not encountered in the same order, then a new template must be generated, as described in the next step (3).

The simplest implementation of the next step (3) involves the retention of memory location of the start of the opening tag along with that of the corresponding data at the end of the tag: for instance, the two memory locations of <LISTPRICE> and the actual amount $4.99. An exception to this is found when the tag contains an attribute. Because this will be known from the process in (1)(a) above, for instance, by establishing if the tag contains an equals sign '=' as in the case of <BREAD CHAR="BAKERS BEST"/> where there is no corresponding closing </BREAD> tag, then the data location will be contained within the tag itself.

A more sophisticated, and efficient, implementation of this step (3) involves retaining both the memory offset for the tags and associated data and/or attributes, but also the size of the data elements. Depending on the nature of the tag, this can be done simply by searching character by character forward until the next < or more precisely the sequence </ is encountered. The size of the data element is therefore the offset of this < minus that of the closing > for the opening bracket. Storing the data size as well as offsets, and order of tag offsets, would allow rapid memory actions to retrieve the data elements themselves when XML documents of the same type, identified by the type and order of the tags stored in the internal array, are presented, rather than having to walk from the opening tag to the end of the data contents during the actual parsing itself which would involve both a byte-by-byte compare and copy action.

This initial process, therefore, retains information from a rapid review of the XML document as it is presented to the parser. The purpose of this is to establish whether a template (the two dimensional array described under step (1)(d) above) is available or whether a new one must be generated. The difference between retaining just the ordered memory offsets and augmenting these data with additional information at this stage are illustrated in FIGS. 6 to 8.

Current parsers such as DOM and SAX parsers adopt slightly different approaches, with varying effects on processor and memory requirements. A DOM parser generates a full tree representation of the document, requiring significant processing, but is very accurate. A SAX parser, by contrast, is event driven. When a tag is encountered, it initiates a specific event or action. In consequence, processor requirements are minimized, but elapsed time is increased since this is more closely akin to interpreting the document at runtime. By simplifying upfront template generation, but retaining information on depth and data location as well as size, this implementation provides the benefits of both approaches without requiring additional processor capacity or lengthy interpretation.

Figure 9:
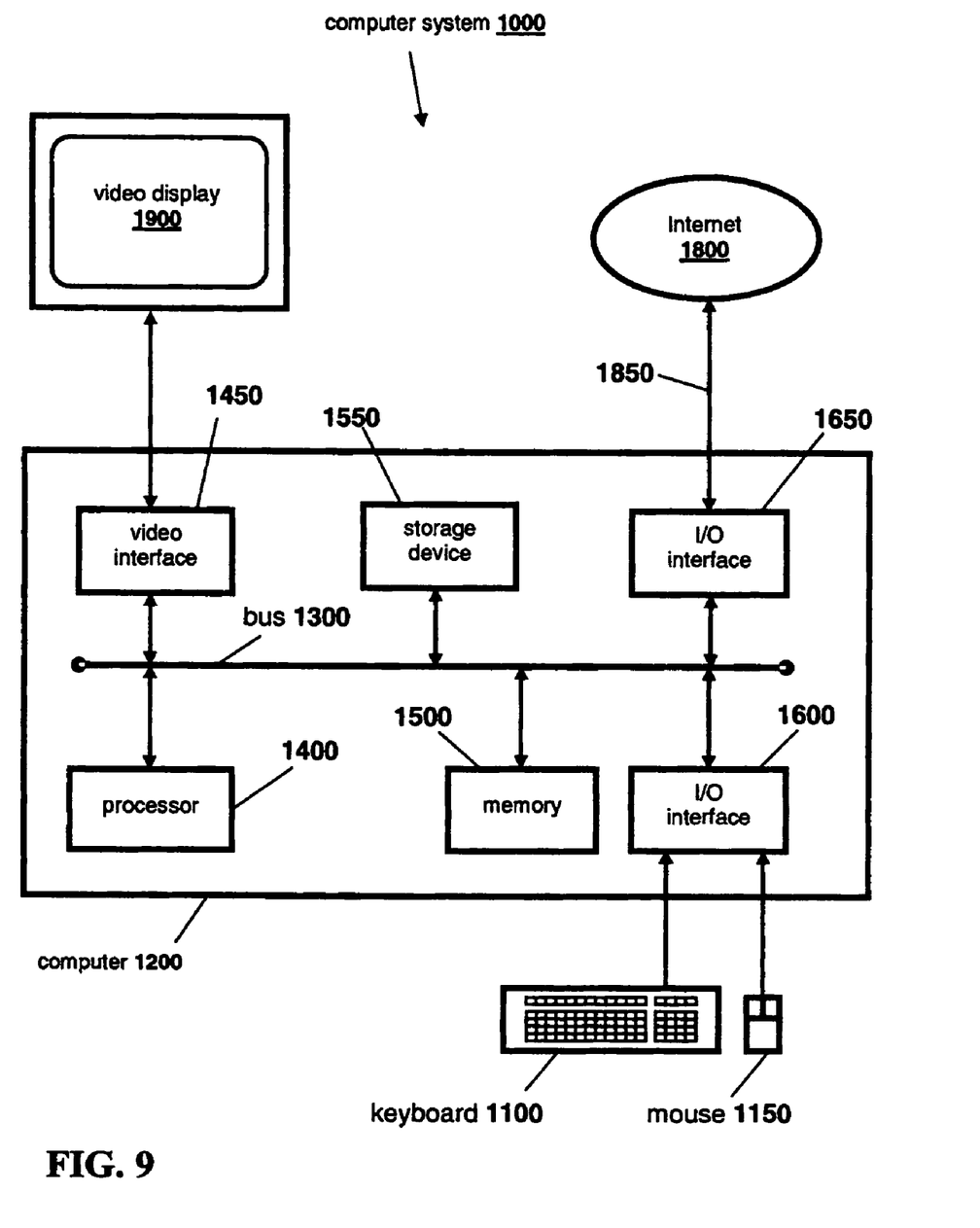
FIG. 9 is a schematic representation of a computer system suitable for performing the techniques described herein.

FIG. 9 is one example of a processing device 1000 suitable for executing computer software for generating an XML parser, and for executing computer software for parsing an XML document in accordance with the techniques described above. Other processing devices which are suitable for executing the software can be a wireless telephone, personal assistant device (PDA), portable computer, smart remote control device, or any other processing devices that can execute such software.

The processing device as shown in FIG. 9 is a computer system 1000 of a type that executes under a suitable operating system installed on the computer system 1000, and may be thought of as comprising various software code means for achieving the particular steps of the aforementioned methods of generating an XML parser, and parsing an XML document.

The components of the computer system 1000 include a computer 1200, a keyboard 1100 and mouse 1150, and a video display 1900. The computer 1200 includes a processor 1400, a memory 1500, input/output (I/O) interfaces 1600, 1650, a video interface 1450, and a storage device 1550.

The processor 1400 is a central processing unit (CPU) that executes the operating system and the computer software executing under the operating system. The memory 1500 includes random access memory (RAM) and read-only memory (ROM), and is used under direction of the processor 1400.

The video interface 1450 is connected to video display 1900 and provides video signals for display on the video display 1900. User input to operate the computer 1200 is provided from the keyboard 1100 and mouse 1150. The storage device 1550 can include a disk drive or any other suitable storage medium. Each of the components of the computer 1200 is connected to an internal bus 1300 that includes data, address, and control buses, to allow components of the computer 1200 to communicate with each other via the bus 1300. The computer system 1000 can be connected to one or more other similar computers via a input/output (I/O) interface 1650 using a communication channel 1850 to a network, represented as the Internet 1800.

The computer software may be recorded on a portable storage medium, in which case, the computer software program is accessed by the computer system 1000 from the storage device 1550. Alternatively, the computer software can be accessed directly from the Internet 1800 by the computer 1200. In either case, a user can interact with the computer system 1000 using the keyboard 1100 and mouse 1150 to operate the programmed computer software executing on the computer 1200.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implementable method of generating a parser for parsing a marked up document, the method comprising:
    scanning a sample marked up document using a computer system, wherein said sample marked up document comprises a typical document that will be parsed;
    extracting a template from said sample marked up document, wherein said template comprises elements of a structural markup of said sample document with data content associated with said elements removed; and
    generating a parser for parsing other marked up documents corresponding to said typical document, wherein said generated parser is implementable by said computer system and is based on said extracted template so that said generated parser extracts any data content, of said other marked up documents to be parsed, corresponding to said elements of said extracted template.

2. The method of claim 1, wherein a markup language is selected from one of XML, HTML and WML, and said sample marked up document and said other marked up documents to be parsed are selected from one of XML, HTML and WML documents.

3. The method of claim 1, wherein said template is extracted in the form of a table, said table comprising records each having a plurality of fields, one field for storing items of said structural markup of said sample document, one field for identifying a type of said items, and other fields for indicating a location of said items in a tree of said structural markup of said sample document.

4. The method of claim 1, wherein a markup language is XML and said sample marked up document and said other marked up documents to be parsed are XML documents, and wherein said template is extracted in the form of a table, said table comprising records each having a plurality of fields, a first field for storing items of said structural markup of said sample document, a second field for identifying a type of item, and other fields for indicating a location of these items in a tree of said structural markup of said sample document.

5. The method of claim 4, wherein said type of item includes an XML header, opening tags, closing tags, a start of a tag containing an attribute, an attribute of a tag, an end of an attribute, and a tag containing said attribute.

6. A computer program product for generating a parser for parsing a marked up document, the computer program product comprising:
    a computer readable storage medium having computer useable program code embodied therewith, the computer useable program code comprising:
    computer usable program code configured to scan a sample marked up document, wherein said sample marked up document comprises a typical document that will be parsed;
    computer usable program code configured to extract a template from said sample marked up document, wherein said template comprises elements of a structural markup of said sample document with data content associated with said elements removed; and
    computer usable program code configured to generate a parser for parsing other marked up documents corresponding to said typical document, wherein said generated parser is generated in a form based on said extracted template so that said generated parser extracts any data content of said other marked up documents to be parsed corresponding to said elements of said extracted template.

7. The computer program product of claim 6, wherein a markup language is selected from one of XML, HTML and WML, and said sample marked up document and said other marked up documents to be parsed are selected from one of XML, HTML and WML documents.

8. The computer program product of claim 6 wherein said template is extracted in the form of a table, said table comprising records each having a plurality of fields, one field for storing items of said structural markup of said sample document, one field for identifying a type of said items, and other fields for indicating a location of said items in a tree of said structural markup of said sample document.

9. The computer program product of claim 6, wherein a markup language is XML and said sample marked up document and said other marked up documents to be parsed are XML documents, and wherein said template is extracted in the form of a table, said table comprising records each having a plurality of fields, a first field for storing items of said structural markup of said sample document, a second field for identifying a type of item, and other fields for indicating a location of these items in a tree of said structural markup of said sample document.

10. The computer program product of claim 9, wherein said type of item includes an XML header, opening tags, closing tags, a start of a tag containing an attribute, an attribute of a tag, an end of an attribute, and a tag containing said attribute.

* * * * *